United States Patent
Soffer et al.

(10) Patent No.: US 11,677,785 B2
(45) Date of Patent: Jun. 13, 2023

(54) SECURITY POLICY AS A SERVICE

(71) Applicant: SAP PORTALS ISRAEL LTD., Ra'anana (IL)

(72) Inventors: Guy Soffer, Ra'anana (IL); Gilad Keinan, Kfar Saba (IL)

(73) Assignee: SAP PORTALS ISRAEL LTD., Ra'anana (IL)

( * ) Notice: Subject to any disclaimer, the term of this patent is extended or adjusted under 35 U.S.C. 154(b) by 555 days.

(21) Appl. No.: 16/273,389

(22) Filed: Feb. 12, 2019

(65) Prior Publication Data

US 2020/0259864 A1 Aug. 13, 2020

(51) Int. Cl.
*H04L 9/40* (2022.01)
*H04L 41/28* (2022.01)

(52) U.S. Cl.
CPC .............. *H04L 63/20* (2013.01); *H04L 41/28* (2013.01); *H04L 63/102* (2013.01)

(58) Field of Classification Search
CPC ........ H04L 63/20; H04L 41/28; H04L 63/102
See application file for complete search history.

(56) References Cited

U.S. PATENT DOCUMENTS

| | | | |
|---|---|---|---|
| 8,595,287 B2* | 11/2013 | Chen ...................... | G06Q 10/06 709/203 |
| 9,571,524 B2* | 2/2017 | Dotan ..................... | H04L 63/20 |
| 9,754,303 B1* | 9/2017 | Jagtap ................. | G06Q 30/0621 |
| 2009/0099882 A1* | 4/2009 | Karabulut .............. | G06Q 10/06 705/1.1 |
| 2013/0283336 A1* | 10/2013 | Macy .................... | G06F 21/577 726/1 |

(Continued)

FOREIGN PATENT DOCUMENTS

EP 3054646 A1 8/2016

OTHER PUBLICATIONS

Extended European Search Report for Application 20156080.2 dated Jun. 12, 2020, 9 pp.

(Continued)

*Primary Examiner* — Patrice L Winder
*Assistant Examiner* — Angela M Widhalm De Rodriguez
(74) *Attorney, Agent, or Firm* — Buckley, Maschoff & Talwalkar LLC

(57) ABSTRACT

According to some embodiments, a security model data store may contain a plurality of potential security policies, each accessible by multiple external applications. A security specifications data store may contain a plurality of potential security specifications, each accessible by the multiple external applications. A security policy engine computer platform may receive from an external application an indication identifying a security policy package. The security policy engine may then retrieve, based on the received indication, one of the potential security models from the security policy data store. Similarly, the security policy engine may retrieve, based on the received indication, one of the potential security specifications from the security specifications data store. The security policy engine may then arrange for a security policy package to be implemented for the external application, the security policy packing being associated with the retrieved potential security model and the retrieved potential security specification.

19 Claims, 12 Drawing Sheets

(56) References Cited

U.S. PATENT DOCUMENTS

| | | | | |
|---|---|---|---|---|
| 2014/0331280 A1* | 11/2014 | Porras | ................ | H04L 63/20 |
| | | | | 726/1 |
| 2015/0188927 A1* | 7/2015 | Santhi | ................ | H04L 67/1002 |
| | | | | 726/4 |
| 2015/0304234 A1* | 10/2015 | Salle | ................ | G06F 7/00 |
| | | | | 709/226 |
| 2018/0027006 A1* | 1/2018 | Zimmermann | ..... | H04L 63/0245 |
| | | | | 726/11 |
| 2020/0036593 A1* | 1/2020 | Sethi | ................ | H04L 41/145 |
| 2020/0218798 A1* | 7/2020 | Kosaka | ................ | G06F 9/455 |

OTHER PUBLICATIONS

Faria Mehak et al., "ECAF: extensibile access control framework for cloud environments", Annales Des Communications, vol. 72, No. 5. Nov. 21, 2016, 17 pp.

Wu, et al., "ACaaS Access Control as a Service for IaaS Cloud", 2013 International Conference on Social Computing, IEEE, Sep. 8, 2013, 6 pp.

"Communication pursuant to Article 94(3) EPC Office Action", dated Feb. 3, 2022 (dated Feb. 3, 2022), European Patent Office, for European Application No. 20156080.2-1218, 6pgs.

* cited by examiner

SECURITY POLICY AS A SERVICE

FIELD

Some embodiments are associated with security policies. In particular, some embodiments provide for an automated implementation of a security policy as a service.

BACKGROUND

An enterprise may let entities (e.g., employees or customers) access and/or alter information. For example, a business might let employees access financial information, sales data, human resource files, etc. via an application. Typically, the enterprise may implement a "security policy" to let different entities access and/or alter this information in different ways. For example, some customers might be allowed to upload information via the application while other customers are only able to view the information. These security policies are generally written directly into the application. Such an approach, however, can be a time consuming and error-prone processes, especially when there are a large number of security policy options. Moreover, a change to a security policy might require that a substantial number of applications need to be re-written to support the change.

It may therefore be desirable to provide systems and methods to facilitate an automated implementation of a security policy as a service in an accurate and efficient manner.

SUMMARY OF THE INVENTION

According to some embodiments, systems, methods, apparatus, computer program code and means are provided to facilitate an automated implementation of a security policy as a service in an accurate and efficient manner. In some embodiments, a security model data store may contain a plurality of potential security policies, each accessible by multiple external applications. A security specifications data store may contain a plurality of potential security specifications, each accessible by the multiple external applications. A security policy engine computer platform may receive from an external application an indication identifying a security policy package. The security policy engine may then retrieve, based on the received indication, one of the potential security models from the security policy data store. Similarly, the security policy engine may retrieve, based on the received indication, one of the potential security specifications from the security specifications data store. The security policy engine may then arrange for a security policy package to be implemented for the external application, the security policy packing being associated with the retrieved potential security model and the retrieved potential security specification.

Some embodiments comprise: means for receiving, by a security policy engine computer platform from an external application, an indication identifying a security policy package; means for retrieving, by the security policy engine computer platform, based on the received indication, a potential security models from a security policy data store, wherein the security model data store contains a plurality of potential security policies, each accessible by multiple external applications; means for retrieving, by the security policy engine computer platform based on the received indication, potential security specifications from a security specifications data store, wherein the security specifications data store contains a plurality of potential security specifications, each accessible by the multiple external applications; and means for arranging, by the security policy engine computer platform, for a security policy package to be implemented for the external application, the security policy packing being associated with the retrieved potential security model and the retrieved potential security specification.

In some embodiments, a communication device associated with a secure security policy engine exchanges information in connection with one or more security policy packages. The information may be exchanged, for example, via public and/or proprietary communication networks.

Technical effects of some embodiments of the invention are improved and computerized ways to facilitate an automated implementation of a security policy as a service in an accurate and efficient manner. With these and other advantages and features that will become hereinafter apparent, a more complete understanding of the nature of the invention can be obtained by referring to the following detailed description and to the associated drawings appended hereto.

DETAILED DESCRIPTION

The following description is provided to enable any person in the art to make and use the described embodiments and sets forth the best mode contemplated for carrying out some embodiments. Various modifications, however, will remain readily apparent to those in the art.

An enterprise may let entities (e.g., employees or customers) access and/or alter information. For example, a business might let employees access financial information, sales data, human resource files, etc. via an application. Typically, the enterprise may implement a "security policy" to let different entities access and/or alter this information in different ways. For example, some customers might be allowed to upload information via the application while other customers are only able to view the information.

Figure 1:
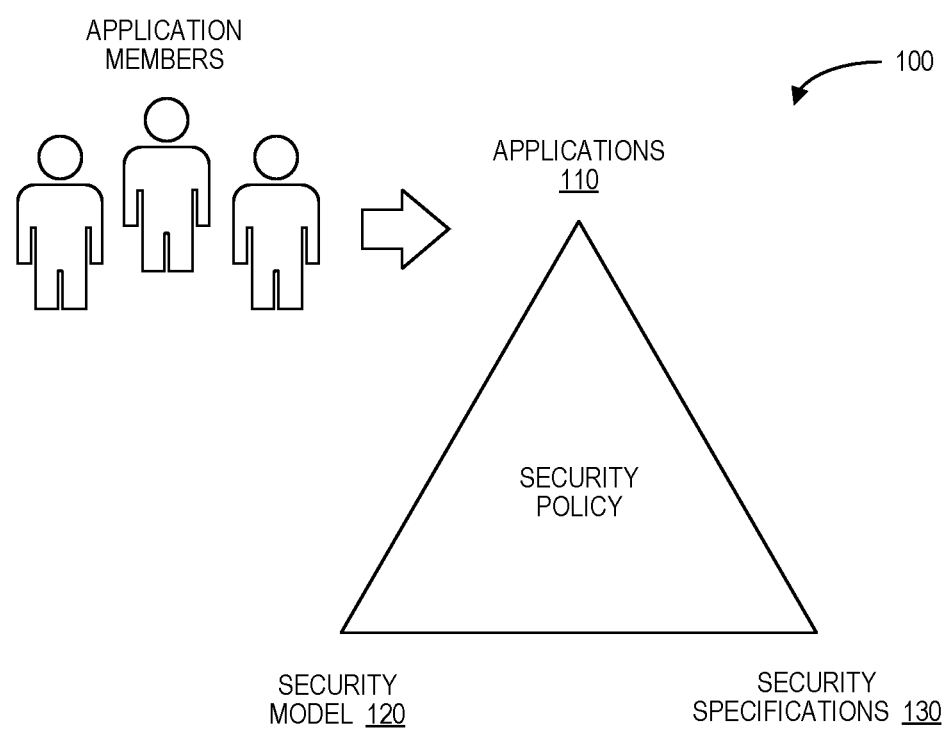
FIG. 1 is a security policy diagram.

FIG. 1 is a security policy diagram 100. As illustrated in the diagram 100, application members may access applications 110 associated with a security model 120 and security specifications 130. Note that any software application 110 might implement a component designed to be "bullet proof" to handle a security policy. Without such a component, applications 110 may be vulnerable and unable to protect data and services from unauthorized access (as compared to having the information available in a confidential and integrated way). A used herein, the phrase "security model" 120 might refer to any abstract model that defines how data and services are secured taking into account a company's usage, customers, and constraints.

Figure 2:
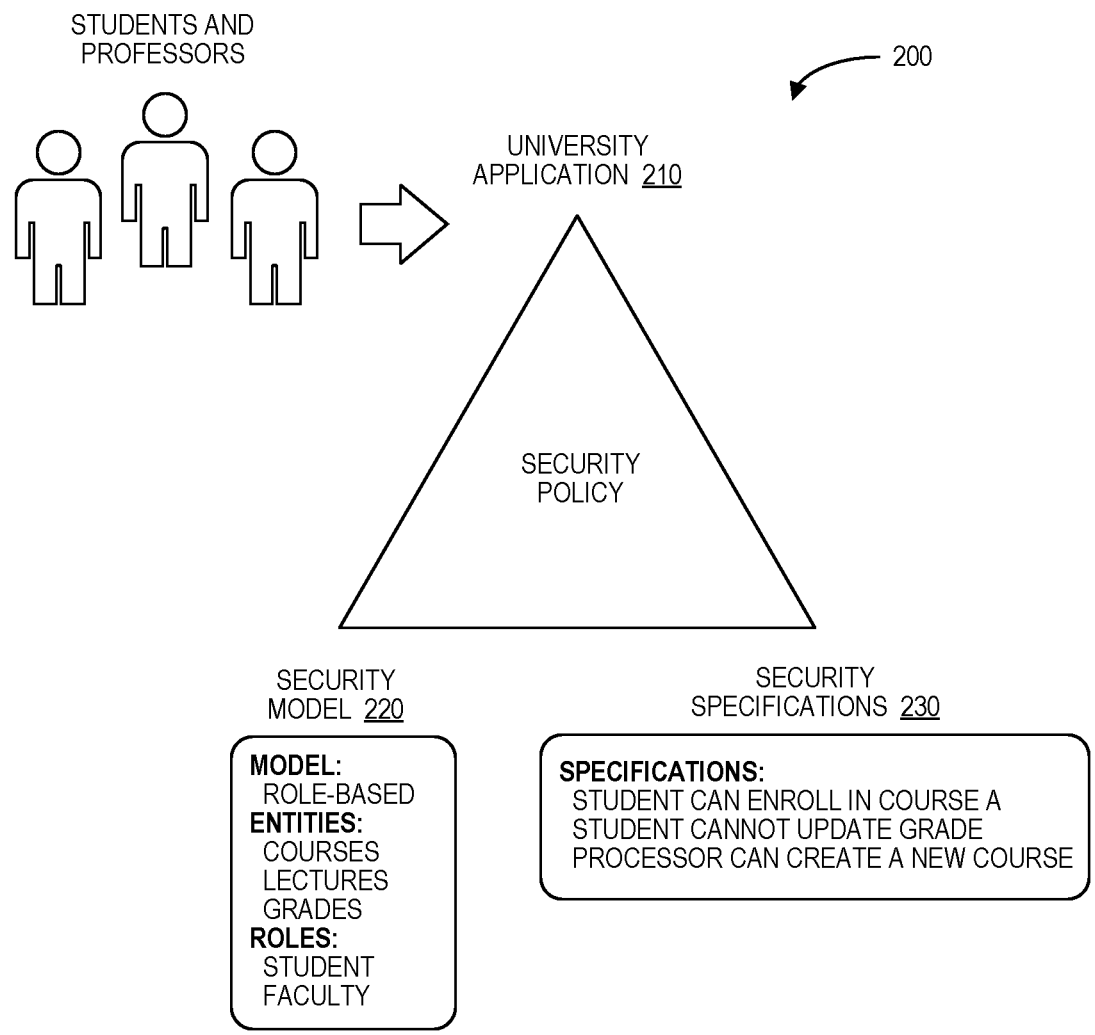
FIG. 2 is an example of a security policy diagram for a specific university application.

Consider, for example, FIG. 2 which is an example of a security policy diagram 200 for a specific university application 210. Here, a security model 220 may need to describe the model of the security strategy and the structure of the application's entities, constraints, and business objects. One such security model 220 is a "role-based security model," where a user needs to have a role to access an entity. For example:

Role definition
   Student
   Professor
   . . .
Entities
   Lectures
   Courses
   . . .

Referring again to FIG. 1, the security specifications 130 may represent a list of rules and permissions (authorizations) that are defined based on a security model. In the example diagram 200 of FIG. 2, security specifications 230 for the university application 210 might include:

Students can enroll in course A
Students cannot update or modify grades
Professors can create a new course Note that each application may demand a different implementation of its security policy, including an appropriate security model and security specifications. There are many aspects involved in defining such a security policy, which can make the task a very complex effort. By way of example only, an enterprise may want to consider if the security policy based on a mandatory or discretionary approach. In a mandatory model if user has access to a specific class, he or she can access all objects in that class, and authorizations may be persisted centrally. In contrast, a discretionary model might be created on a "need-to-know" basis such that the owner of an entity decides who can access the object (e.g., similar to today's operating systems). Another consideration might be whether the security policy is open or closed. In an open policy, a user can access all objects. In a closed policy, a user by default cannot access any object. Other decisions might be made about whether a security is based on an object name, object content, and/or object context and whether the policy is based on individual users, groups, or roles (e.g., if the policy is based on a group, it might be enough for a user to be part of a group to be given access while in a role-based policy the user may need to receive a role before being allowed to access data).

As a result of these types of considerations and decisions, implementing a security policy can be a complex task (e.g., there is usually not enough time to cover all use cases) and properly designing the policy often requires an advanced security skill set (e.g., a security expert who understands all security aspects to develop a bullet-proof model for a particular application). Moreover, the task is risky (because mistakes in the design or implementation could lead to vulnerability and data loss) and time consuming (because detailed knowledge about the application may be required for proper implementation). Also note that a security policy is generally not re-usable by other application. Even when a security policy could in theory fit multiple applications, the specific implementation cannot be shared across different technologies and/or deployments constraints. In addition, changing a security policy requires considerable effort and an update to the application upgrade, and, for large companies, many different implementations utilize different security policies without any common security framework. This can make it difficult to govern the security policies to ensure that they comply with company security guidelines.

Figure 3:
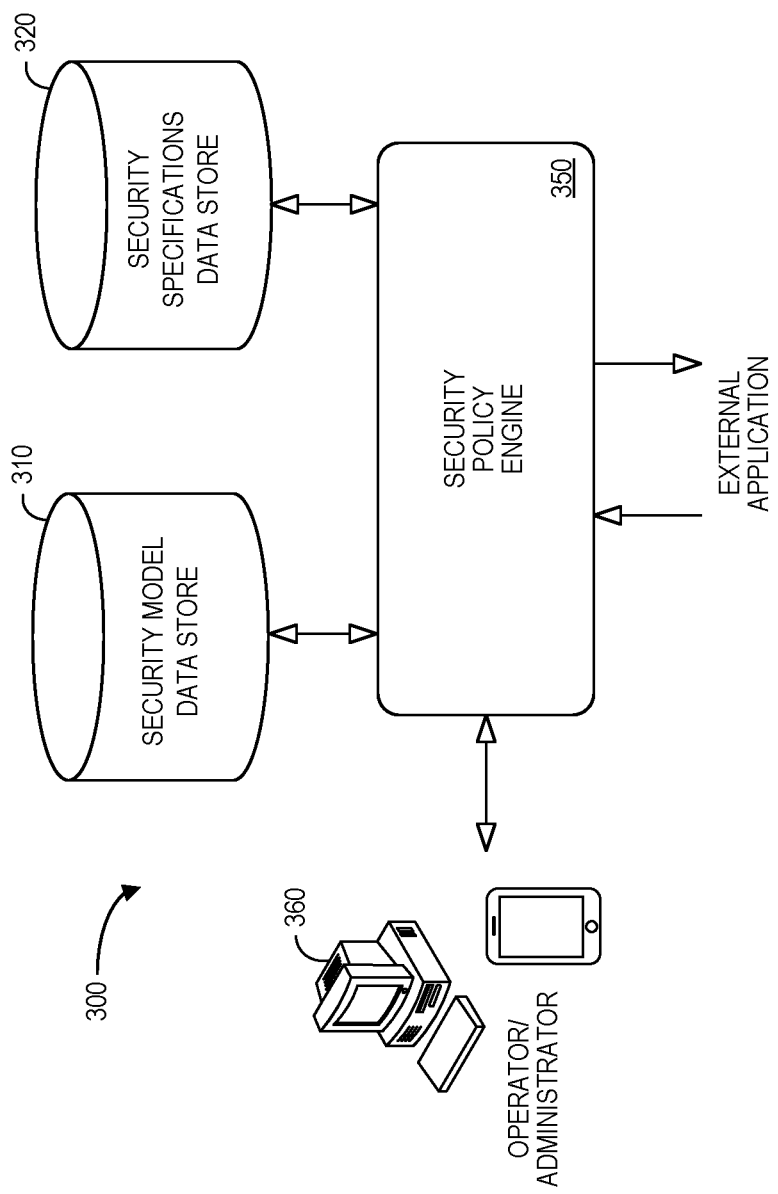
FIG. 3 is a block diagram of a security policy implementation system according to some embodiments.

It may therefore be desirable to provide systems and methods to facilitate an automated implementation of a Security Policy as a Service ("SPaaS") in an accurate and efficient manner. FIG. 3 is a block diagram of a security policy implementation system 300 according to some embodiments. In particular, the system 300 includes a security model database 310 (e.g., containing electronic records associated with potential security models), a security specifications database 320 (e.g., containing electronic records associated with potential security specifications), a security policy engine 350, and a remote operator or administrator computer 360. The security policy engine 350 may, according to some embodiment, provide SPaaS be receiving a link or identifier from an external application (e.g., a mobile application). Based on the received information, the security policy engine 350 may access the appropriate information from the security model data store 310 and the security specification data store 320 to implement an appropriate security policy for the external application. The security policy engine 350 might be, for example, associated with a Personal Computers ("PC"), laptop computer, an enterprise server, a server farm, and/or a database or similar storage devices.

As used herein, devices, including those associated with the security policy engine 350 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks. According to some embodiments, an "automated" security policy engine 350 may provide SPaaS. As used herein, the term "automated" may refer to, for example, actions that can be performed with little or no human intervention.

The security policy engine 350 may store information into and/or retrieve information from databases (e.g., at the security model data store 310 and/or security specifications data store 310). The databases might be, for example, locally stored relational database or reside physically remote from the security policy engine 350. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical operator interface may provide an ability to access and/or modify elements of the system 300 via remote devices 360. The operator interface might, for example, let an operator or administrator analyze security policy performance, manage security policy creation and/or transitions, etc.

Note that any number of security policy engines 350 might be included in the system. Moreover, various devices described herein might be combined according to embodiments of the present invention. For example, in some embodiments, the security policy engine 350 and a security model data store 310 might be co-located and/or may comprise a single apparatus. Moreover, the functions described herein might be implemented in a cloud-based environment and/or by a service provider (e.g., performing services for one or more enterprises, departments, or businesses).

Figure 4:
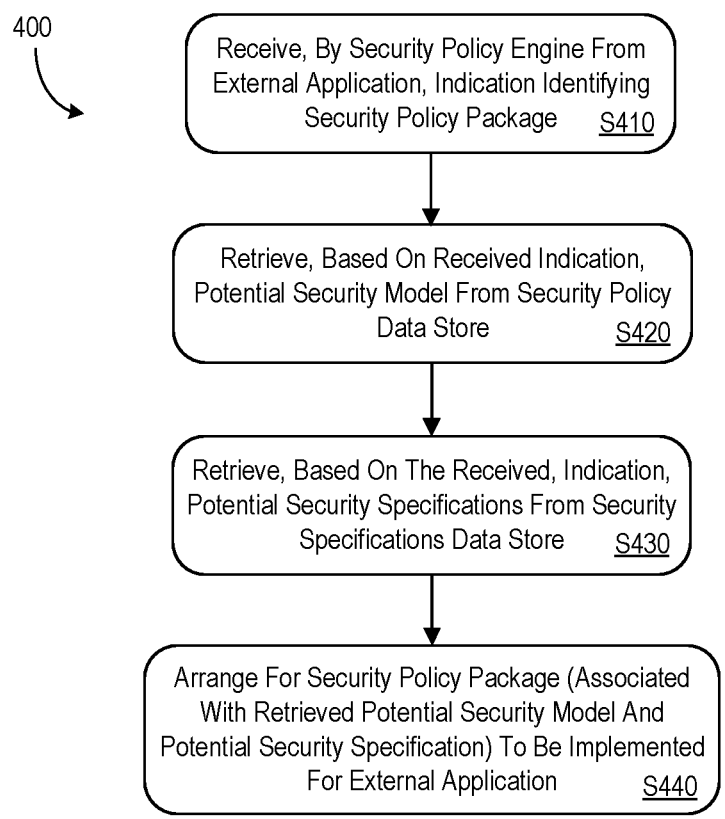
FIG. 4 illustrates a security policy implementation method in accordance with some embodiments.

FIG. 4 illustrates a security policy implementation method 400 that might be performed by some or all of the elements of the system 300 described with respect to FIG. 3, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, a security policy engine computer platform might receive, from an external application, an indication identifying a security policy package (e.g., an identifier, link, or any other indication). At S420, the security policy engine computer platform might retrieve, based on the received indication, a potential security models from a security policy data store, wherein the security model data store contains a plurality of potential security policies, each accessible by multiple external applications. The security model data store might contain, for example, customer security models, security model templates, pluggable components, etc. According to some embodiments, a potential security models includes a role definition and/or an entity. A potential security model might be associated with, for example, a take-grant model, an attribute-based access control, a Bell-LaPadulla protocol, a Chinese wall model, or any other access control protocol (as described in more detail with respect to FIG. 5).

At S430, the security policy engine computer platform might retrieve, based on the received indication, potential security specifications from a security specifications data store, wherein the security specifications data store contains a plurality of potential security specifications, each accessible by the multiple external applications. The security specifications data store might contain, for example, customer security models, security model templates, pluggable components, etc. At least one of the potential security specifications might be associated with, for example, a healthcare application, a finance application, a software application, an education application, or any other enterprise application. According to some embodiments, at least one of the potential security specifications is associated with a list of rules and permissions. At S440, the security policy engine computer platform may then arrange for a security policy package to be implemented for the external application (the security policy packing being associated with the retrieved potential security model and the retrieved potential security specification), thus providing the SPaaS.

Figure 5:
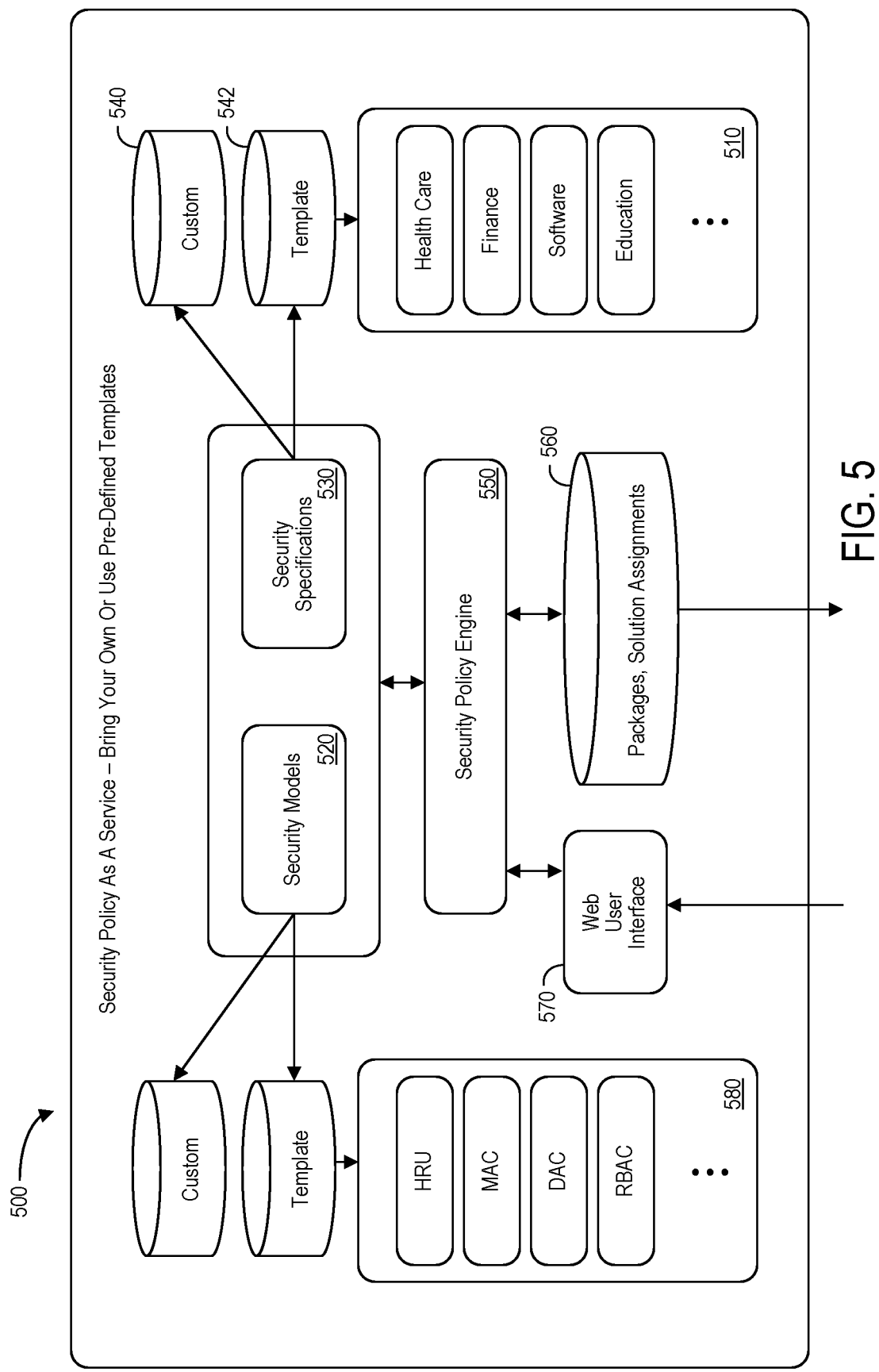
FIG. 5 is a security policy as a service apparatus according to some embodiments.

FIG. 5 is a SPaaS apparatus 500 that provides a unified framework to implement a security policy for an external application according to some embodiments. Some embodiments may separate a security policy model 510 and specifications 530 into pluggable components with pre-defined and well-known implementations (via templates) and/or develop customized components for specific scenarios and use cases.

A security policy engine 550 may be responsible for the core implementation of the solution. The security policy engine 550 may be connected to a database 560 of the system and manage security models and specification templates along with custom implementation. According to some embodiments, a web user interface 570 might act as a front-end of the engine 550 for security architects, allowing them to manage the security model and specifications, create custom solutions, design new security templates, assign a package to a solution (e.g., a set of applications that use the same security package), etc. According to some embodiments, security templates may be created for well-known, pre-defined standard security models and/or specifications. The system 500 may, for example, define a schema that describes a security template to let the system 500 manage any existing or new implementation.

According to some embodiments, a security model 580 might be associated with a Harrison, Ruzzo, Ullman ("HRU") implementation (an operating system level computer security model which deals with the integrity of access rights in the system). The HRU model defines a protection system consisting of a set of generic rights R and a set of commands C. A description of the system is called a configuration and is defined as a tuple (S, 0, P) of current subjects S, current objects O, and an access matrix P. As another example, the security model might be associated with a Mandatory Access Control ("MAC") implementation where users do not have the authority to override the policies (instead, it is totally controlled centrally by a security policy administrator). Still other security models might be associated with a Discretionary Access Control ("DAC") implementation (where a user has the complete authority over the all resources it owns and also determines the permissions for other users) or a Role-Based Access Control ("RBAC") implementation (where roles are assigned by a system administrator statically and access depends on the roles). A security specification 510 might be associated with a health care application, finance mobile application, software, education packages, etc.

Figure 6:
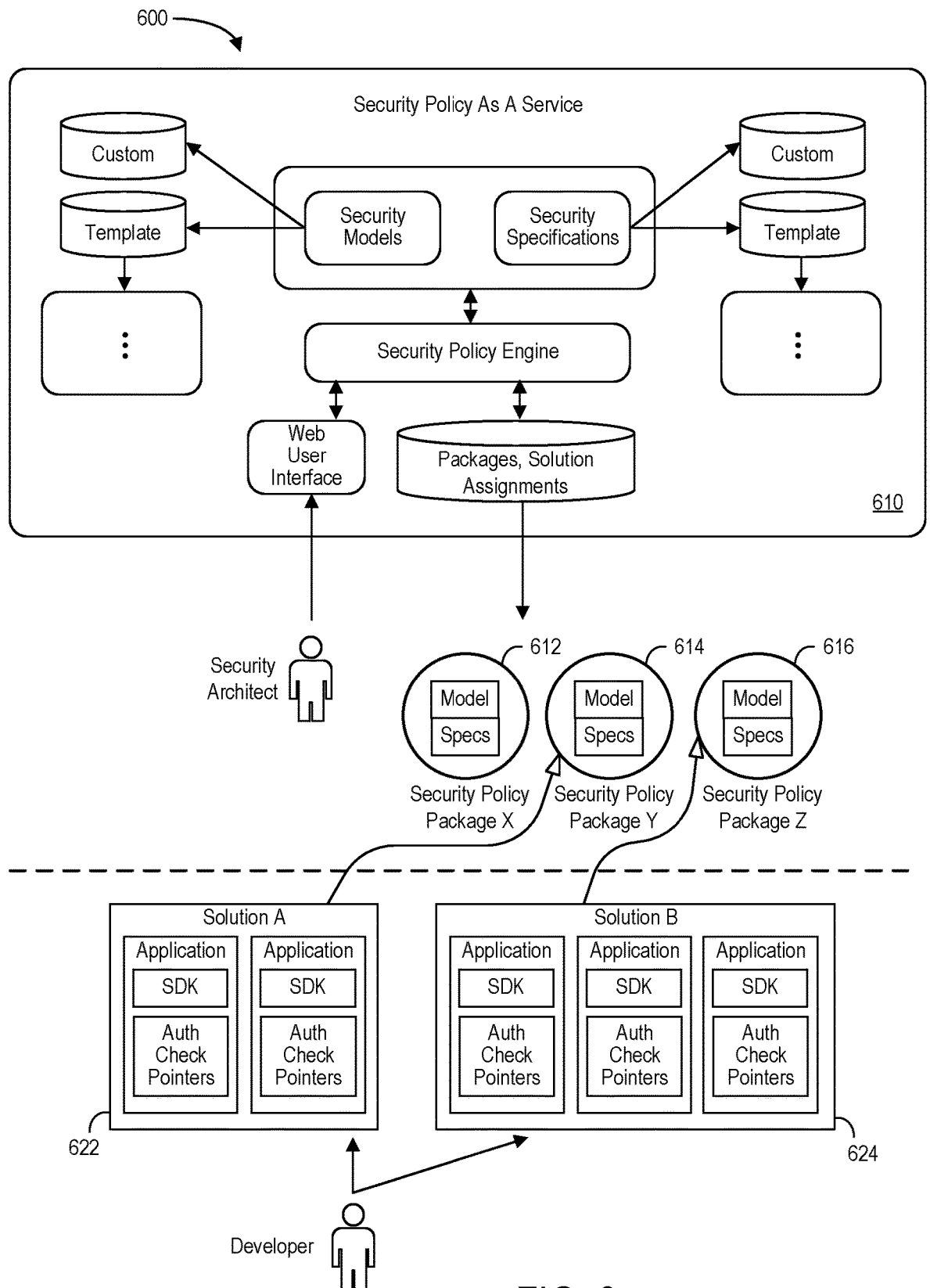
FIG. 6 is a security policy as a service solution diagram in accordance with some embodiments.

FIG. 6 is a security policy as a service solution diagram 600 in accordance with some embodiments. Here, a SPaaS 610 creates security policy packages 612, 614, 616. Each package 612, 614, 616 is a logical group of a security model and security specifications which essentially define a security policy that can be assigned to a solution 622, 624. A security policy engine may expect a generic schema definition of security model and specifications (and essentially a package). This allows for a mix and match of different models and specifications, using templates, custom implementations, etc.

Figure 7:
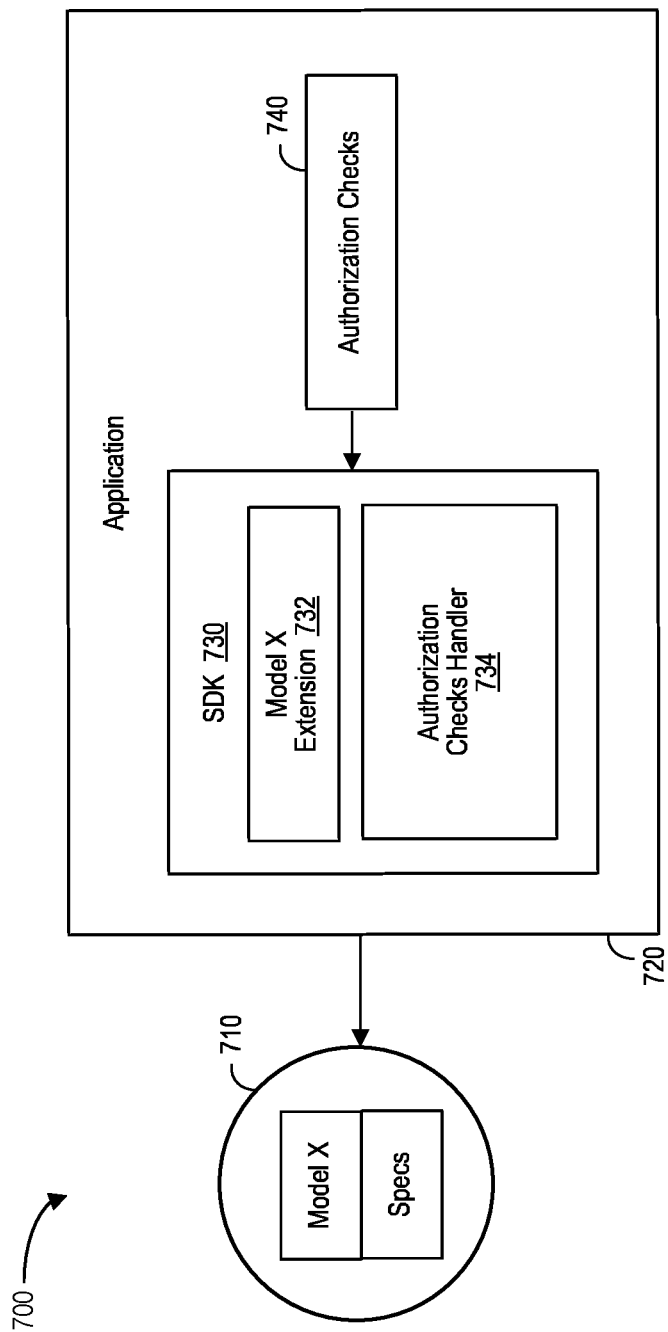
FIG. 7 illustrates the use of a general schema according to some embodiments.

FIG. 7 illustrates the use of a general schema 700 according to some embodiments. The schema includes a package 710 and an application 720. According to some embodiments, a security policy Software Development Kit ("SDK") 730 is provided for the application 720 to integrate between the application 720 and an assigned security policy package 710 (consisting of a particular security model and specification). Note that the SDK 730 may be associated with a set of software development tools that allow for the creation of external software applications for a software package or framework, hardware platform, computer system, operating system, etc. When a new security model is introduced, the SDK 730 is updated with its extension, so the app can seamlessly work with any mode or specifications without code change.

The SDK 730 may expose APIs for developers to perform authorization checks whenever needed in an application with a reference to the actual security implementation. As a result, security implementations may be updated freely without changing the application (that is, the system does need to re-deploy, upgrade, etc.). The SDK 730 might be associated with a model extension 732, an authorization checks handler 734, and authorization checks 740.

Thus, embodiments may provide a system that manages security policies (consisting of a security model and a security specifications) that can be shared and re-used by different applications or products that are deployed on different platforms. Each security model and security specifications may be persisted in a database owned by an owner (and the owner can manage access control). Such a system allows for the sharing of security models and/or security specifications, and the owner of each component can control its sharing options. Note that as a generic solution the system might be implemented using any technology platform and/or any databases schema. For example, the definition of a security model and specifications can be described in any transport data schema (e.g., Extensible Markup Language ("XML"), JavaScript Object Notation ("JSON"), a text file, human readable data, etc.). Moreover, a security management system might be deployed via the cloud or an on-premise system could be maintained based on requirements and landscape constraints. Some embodiments may not enforce a specific communication protocol. This allows for the use centralized or de-centralized (peer-to-peer) communication protocols (each having advantages based on a company's requirements).

According to some embodiments, a security model and specifications ecosystem may be provided. For example, as a pluggable component, a dedicated store might be used to commercialize security models and specifications. Furthermore, social features might be added such as community ratings, public comments and security level rankings or scores (using an official standard security certificate level). A company might, for example, require that developers use only specific security model and specifications to help make governing security implementations a straightforward process.

According to some embodiments, a well-defined and proven model and specifications can be selected so that the company can ensure that the policy has an appropriate implementation. Moreover, an advanced security skill set is not required for developers (e.g., there is no need to employ a security expert who understand all security aspects). In addition, embodiments may make the job of security architects simpler and more transparent. The solution may help security architects by only asking them to define the high-level composition of their solution (which may make it easier for them as compared to systems based on specific configurations). The amount of risk and time involved in creating an appropriate security policy may be reduced, because a security policy may be defined using only well know configurations. Other applications may share and reuse successful security policies, and changes, updates, and improvements to policy components will be automatically reflected in all applications created with these models/specifications. Large companies use this common security framework which makes it easy to implement consistent security policies across multiple applications (also making it easy to govern that applications comply with security guidelines).

Figure 8:
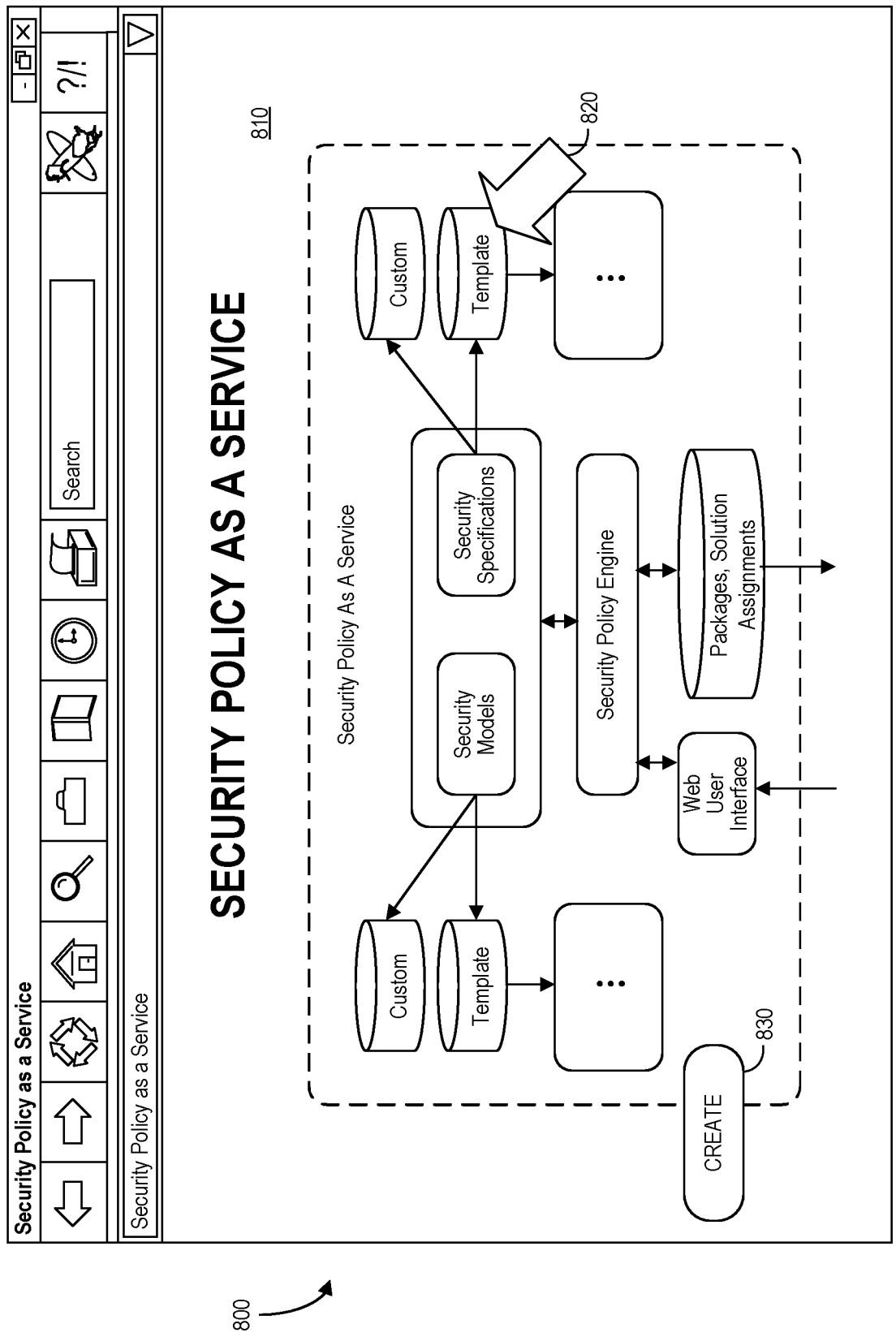
FIG. 8 is a user interface display according to some embodiments.

Note that an operator may arrange to monitor or adjust the operation of various aspects of a SPaaS system, including models, specifications, templates, etc. For example, FIG. 8 is a user interface display 800 according to some embodiments. The display 800 may provide a graphical depiction 810 of a system (e.g., including a security policy engine, templates, customized models and specifications, etc.) to an operator and/or to provide an interactive interface allowing an operator to adjust system components as appropriate. Selection of an element on the display 800 (e.g., via a touchscreen or computer mouse pointer 820) may let the operator see more information about that particular element (e.g., in a pop-up window) and/or adjust operation of that element (e.g., by selecting a new template or a change to a security model). According to some embodiments, selection of a "Create" icon 830 by an operator may initiate the implementation of a security policy package or solution.

Figure 9:
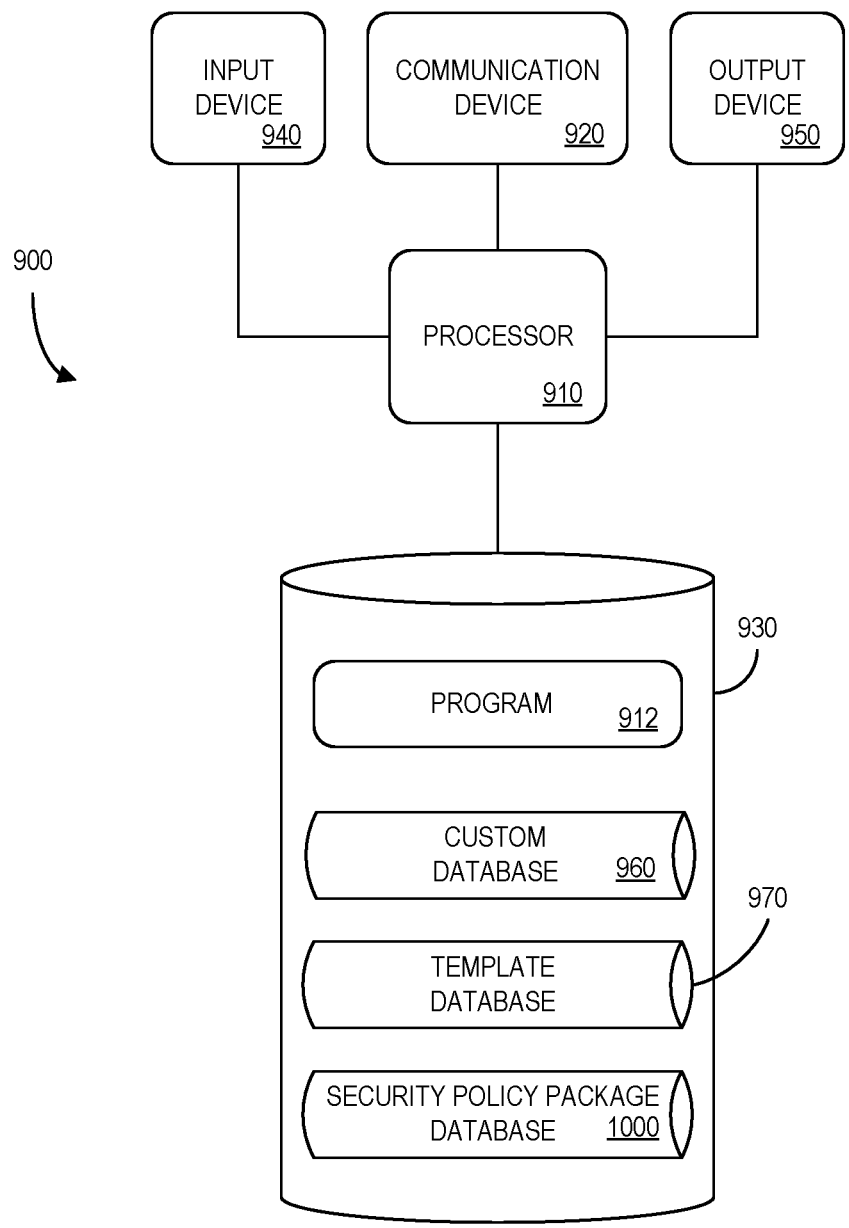
FIG. 9 is a high-level diagram of an apparatus or platform in accordance with some embodiments.

The embodiments described herein may be implemented using any of a number of different computer hardware implementations. FIG. 9 is a block diagram of apparatus 900 according to some embodiments (e.g., the systems 300, 500 of FIGS. 3 and 5, respectively). The apparatus 900 may comprise a general-purpose computing apparatus and may execute program code to perform any of the functions described herein. The apparatus 900 may include other unshown elements according to some embodiments. According to some embodiments, the apparatus 900 includes a processor 910 operatively coupled to a communication device 920, a data storage device 930, one or more input devices 940, and/or one or more output devices 950. The communication device 920 may facilitate communication with external devices, such as remote user or administrator devices. The input device(s) 940 may comprise, for example, a keyboard, a keypad, a mouse or other pointing device, a microphone, knob or a switch, an Infra-Red ("IR") port, a docking station, and/or a touch screen. The input device(s) 940 may be used, for example, to enter information into the apparatus 900 (e.g., about security models, specifications, packages, etc.). The output device(s) 950 may comprise, for example, a display (e.g., a display screen) a speaker, and/or a printer (e.g., to provide security policy status to an operator, summary analytic reports, troubleshooting information, etc.).

The data storage device 930 may comprise any appropriate persistent storage device, including combinations of magnetic storage devices (e.g., magnetic tape, hard disk drives and flash memory), optical storage devices, Read Only Memory ("ROM") devices, etc., while the memory 960 may comprise Random Access Memory ("RAM").

The program code 912 may be executed by the processor 910 to cause the apparatus 900 to perform any one or more of the processes described herein. Embodiments are not limited to execution of these processes by a single apparatus. The data storage device 930 may also store data and other program code for providing additional functionality and/or which are necessary for operation thereof, such as device drivers, Operating System ("OS") files, etc. For example, the processor 910 may receive from an external application an indication identifying a security policy package. The processor 910 may then retrieve, based on the received indication, one of the potential security models from the security policy data store. Similarly, the processor 910 may retrieve, based on the received indication, one of the potential security specifications from the security specifications data store.

The processor 910 may then arrange for a security policy package to be implemented for the external application, the security policy packing being associated with the retrieved potential security model and the retrieved potential security specification.

In some embodiments (such as shown in FIG. 9), the storage device 930 further stores a custom database 960 (e.g., containing customized security models and specifications), a template database 970 (to store templates for commonly used security models and specifications), and a security policy package database 1000. An example of a database that may be used in connection with the apparatus 900 will now be described in detail with respect to FIG. 10. Note that the database described herein is only one example, and additional and/or different information may be stored therein. Moreover, various databases might be split or combined in accordance with any of the embodiments described herein.

Figure 10:
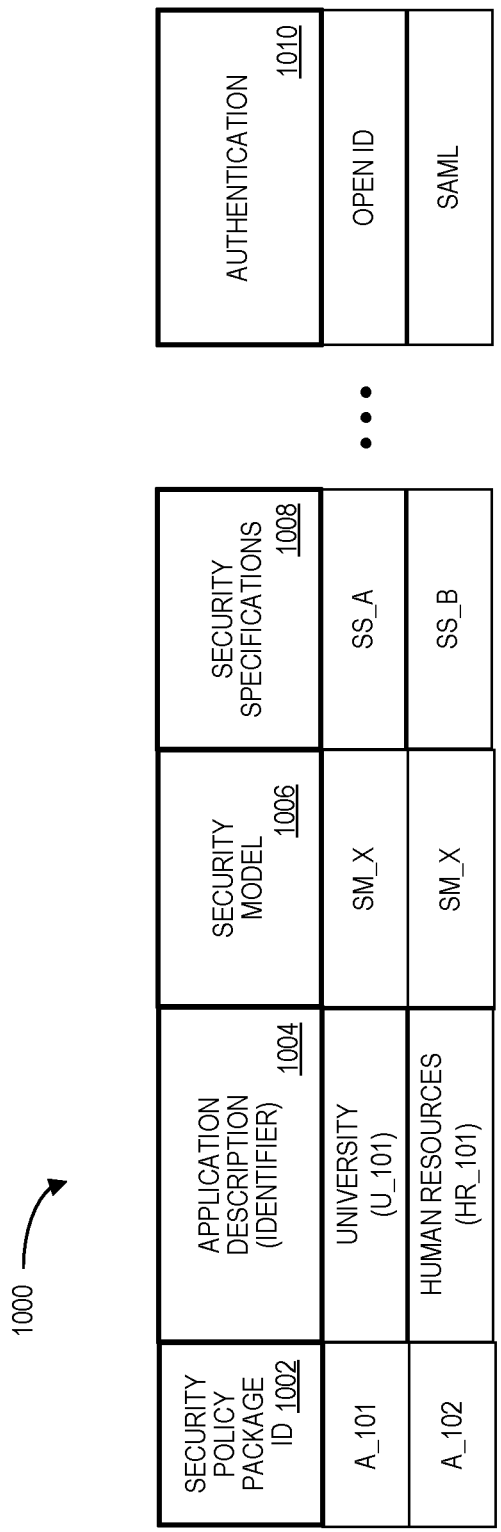
FIG. 10 is a portion of a security policy package database according to some embodiments.

Referring to FIG. 10, a table is shown that represents the security policy package database 1000 that may be stored at the apparatus 900 according to some embodiments. The table may include, for example, entries identifying solutions that are available to be used to implement SPaaS for applications. The table may also define fields 1002, 1004, 1006, 1008, 1010 for each of the entries. The fields 1002, 1004, 1006, 1008, 1010 may, according to some embodiments, specify: a security policy package identifier 1002, an application description 1004, a security model 1006, security specifications 1008, and authentication information 1010. The security policy package database 1000 may be created and updated, for example, based on information received from a security architect, system administrator, etc.

The security policy package identifier 1002 may be, for example, a unique alphanumeric code identifying a particular solution that is available to be used to implement SPaaS for applications. The application description 1004 might describe the security policy package and might include, for example, a link or identifier that may be used by an application select that particular solution. The security model 1006 and security specifications 1008 define the components that can be combined to form that solution (e.g., by including links or identifiers to the details about those elements). The authentication information 1010 might indicate how the solution might authenticate a user or customer (e.g., Open ID, Security Assertion Markup Language ("SAML"), etc.)

Figure 11:
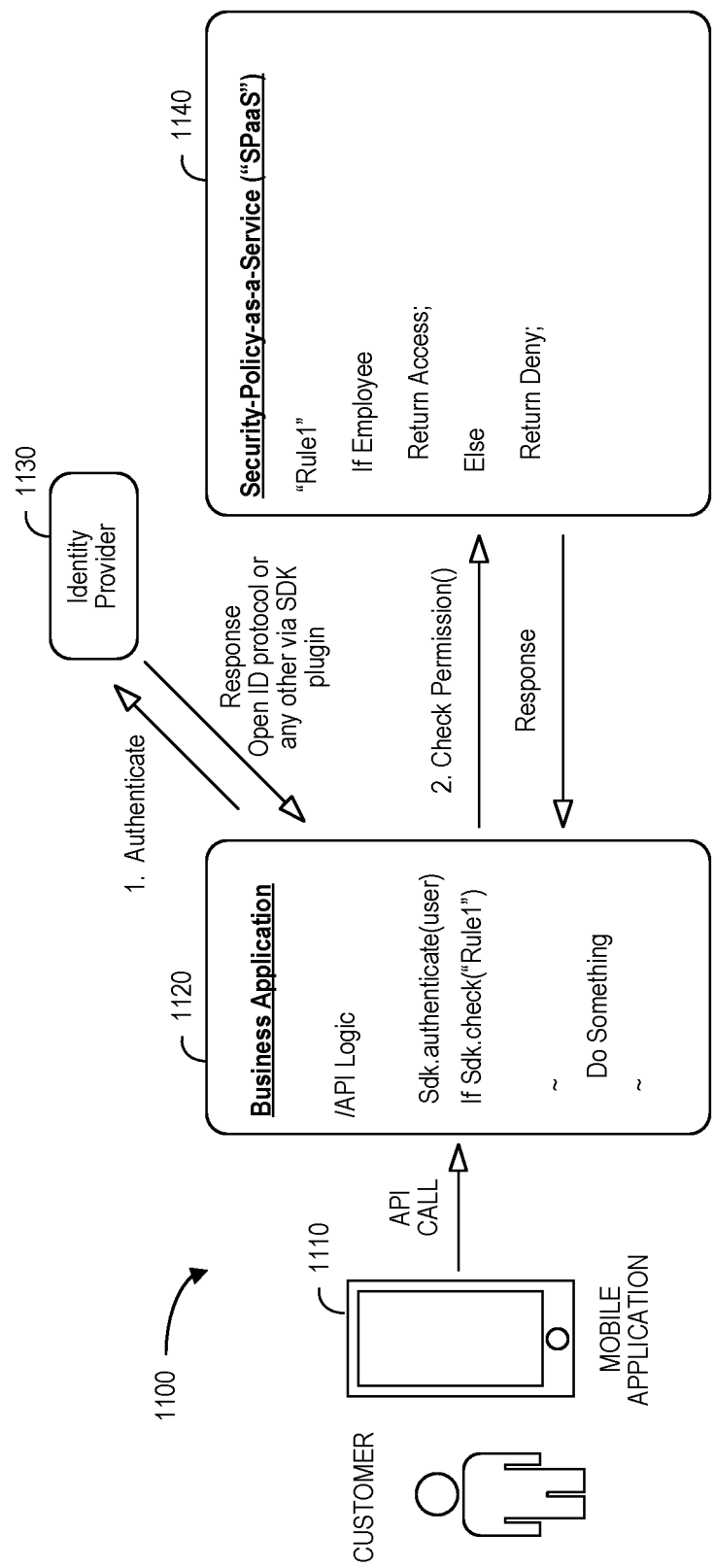
FIG. 11 is a security policy as a service implementation according to some embodiments.

FIG. 11 is a security policy as a service implementation 1100 according to some embodiments. Consider, for example, an application developed to manage a university. The application may be implemented, for example, via a mobile application 1110 used by customers (e.g., students and university employees). The designer may need to integrate a security policy into the mobile application 1110. In this case, the designer may navigate to a security as a service web site and search for the best solution that is most suitable for the current use case. Once selected, the solution may be easily adapted by downloading the security model schema. The designer might implement custom changes to improve a template and create a new private template (or the new template might be shared with others). Later, the designer may easily switch the security model to a different security model that might perform even better. All assignments may be migrated automatically between the models in accordance with some embodiments. In the implementation 1100 of FIG. 11, a business application 1120 may include API logic that initially authenticates the customer's identity via an identity provider 1130 at (1). After authentication, an SDK check may verify permission at (2) using a SPaaS framework 1140. An identifier (e.g., "Rule1") may help locate the appropriate logic in the SPaaS framework 1140.

Thus, embodiments may define a complete security policy as pluggable components that can be shared and reused by multiple applications. As a result, only minimal effort may be required to let application obtain the best security policy solutions. Moreover, embodiments do not replace any authorization manager component (such as SAP HANA® and others). Instead, embodiments may use any authorization manager (e.g., identity provider) as a plugin (an API to authenticate the user and get his or assigned permissions). In addition, embodiments may not own the authentication and authorization processes. This is done by a chosen protocol of the application (e.g., Open ID, certificates, SAML, etc.). The SDK exposes a generic interface for authentication and authorization processes. For a specific protocol like Open ID, a dedicated client component that implements an API can be integrated to the SDK. The SDK can be enhanced with additional protocols based on demand via the generic interface. Such an approach may allow for a dynamic approach implementing the logic of the permissions (logic which is usually hardcoded in the application code). This is because some embodiments store the logic with the model and in the application code by only referring to an identifier. At a later time, the logic can be updated or improved without changing any of the application code. Moreover, designers can optionally share and reuse this logic for other applications.

Thus, embodiments may provide several advantages, such as by providing systems and methods to facilitate an automated implementation of a security policy as a service in an accurate and efficient manner. This may improve the overall efficiency of an enterprise (by reducing the time, expense, errors, and security risks associated with manually coding security policies on an application-by-application basis). This idea can improve the security and the efficiency of both the company (aligning all policies within the company), the developers (by re-using known solutions), and the operators (making it easier to manage security policies).

Figure 12:
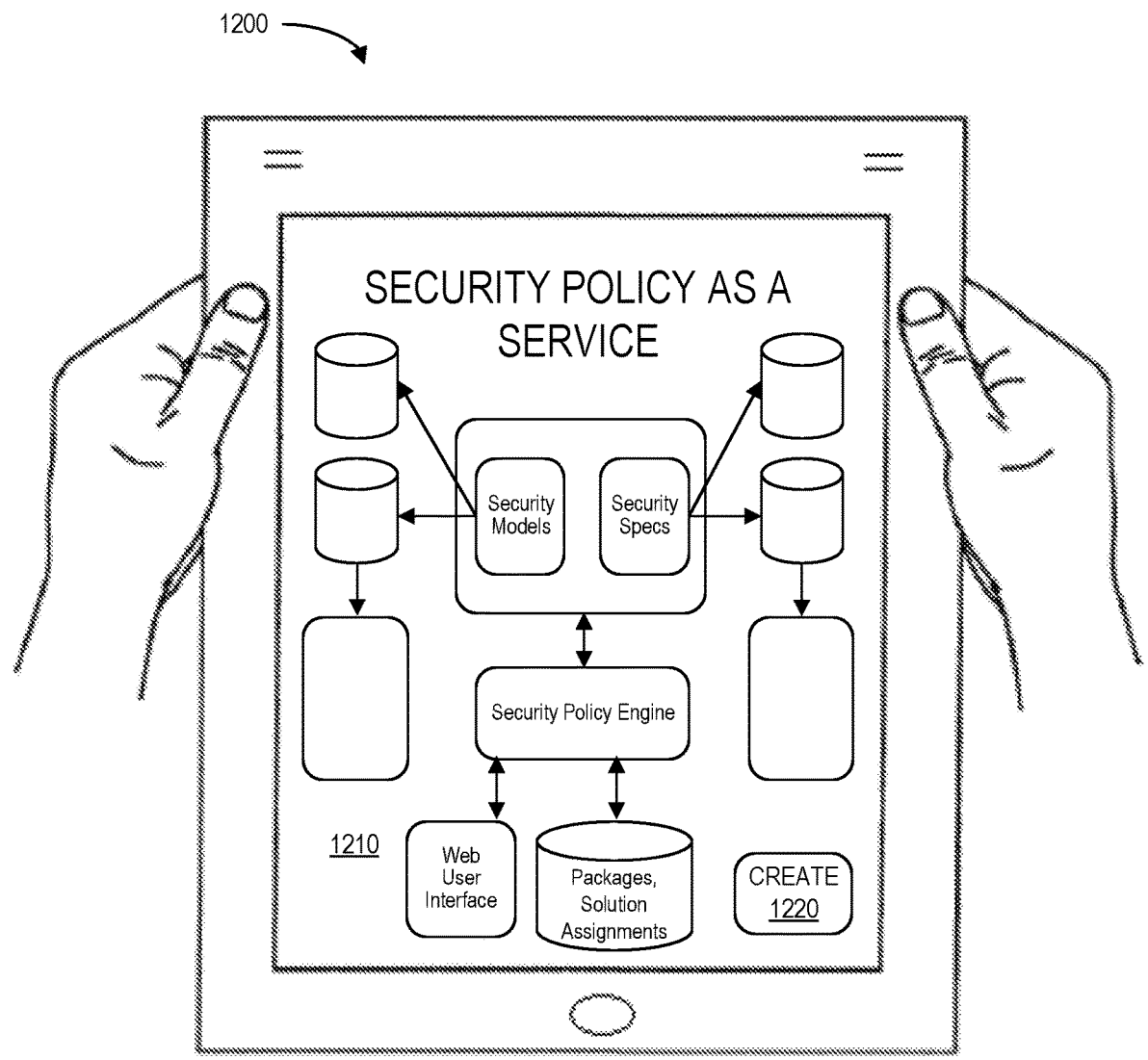
FIG. 12 illustrates a handheld tablet computer in accordance with some embodiments.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the discussed architectures may include a processor to execute program code such that the computing device operates as described herein. Moreover, the displays described are provided only as examples and other types of displays might be implemented. For example, FIG. 12 shows a handheld tablet computer 1100 in accordance with some embodiments. A display 1210 might provide information about implementing a SPaaS, and one or more icons 1220 may be selected by the user to adjust operation of the system (e.g., by initiating the creation of a security policy package or solution, etc.).

All systems and processes discussed herein may be embodied in program code stored on one or more non-transitory tangible computer-readable media. Such media may include, for example, a floppy disk, a CD-ROM, a DVD-ROM, a Flash drive, magnetic tape, and solid-state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system associated with security policy implementation, comprising:
   (a) a security model data store containing a plurality of potential security models, each accessible by multiple external applications;
   (b) a security specifications data store containing a plurality of potential security specifications, each accessible by the multiple external applications; and
   (c) a security policy engine computer platform, coupled to the security model data store and the security specifications data store, the security policy engine computer platform comprising:
   at least one programmable processor; and
   a non-transitory machine-readable medium storing instructions that, when executed by the at least one programmable processor, cause the at least one programmable processor to perform operations comprising:
   (i) receive from an external application an indication identifying a security policy package to be created,
   (ii) retrieve, based on the received indication identifying the security policy package to be created, one of the potential security models from the security model data store, the retrieved potential security model defining how data and services are to be secured,
   (iii) retrieve, based on the received indication identifying the security policy package to be created, one of the potential security specifications from the security specifications data store, the retrieved potential security specification representing a list of rules and authorizations that are defined based on the retrieved potential security model, wherein the potential retrieved security specification and the retrieved security model are distinct from each other; and
   (iv) create a security policy package for the external application as a service, the created security policy package including the retrieved potential security model and the retrieved potential security specification.

2. The system of claim 1, wherein the security model data store contains at least one of: (i) customer security models, (ii) security model templates, and (iii) a pluggable component.

3. The system of claim 1, wherein at least one of the potential security models includes at least one of: (i) a role definition, and (ii) an entity.

4. The system of claim 1, wherein at least one of the potential security models is associated with at least one of: (i) a Harrison, Ruzzo, Ullman protocol, (ii) a mandatory access control protocol, (iii) a discretionary access control protocol, (iv) a rule-based access control protocol, (v) matrix access control, (vi) a take-grant model, (vii) attribute-based access control, (viii) a Bell-LaPadulla protocol, (ix) a Chinese wall model, and (x) any other access control protocol.

5. The system of claim 1, wherein the security specifications data store contains at least one of: (i) customer security models, (ii) security model templates, and (iii) a pluggable component.

6. The system of claim 1, wherein at least one of the potential security specifications is associated with at least one of: (i) a healthcare application, (ii) a finance application, (iii) a software application, (iv) an education application, and (v) any other enterprise application.

7. The system of claim 1, further comprising:
   a web user interface to receive security policy design information from a security architect.

8. The system of claim 1, further comprising:
   a library data store containing security packages and solution assignments.

9. The system of claim 1, wherein the received indication of the security policy package is associated with at least one of: (i) an application programming interface, (ii) a software development kit, (iii) a model extension, and (iv) an authorization check.

10. The system of claim 1, at least one potential security model and potential security specification is associated with at least one of: (i) extensible markup language, (ii) JavaScript object notation, (iii) text, and (iv) human readable information.

11. A computer-implemented method associated with security policy implementation, comprising:
   receiving, by a security policy engine computer platform from an external application, an indication identifying a security policy package to be created;
   retrieving, by the security policy engine computer platform based on the received indication identifying the security policy package to be created, a potential security model from a security model data store containing a plurality of potential security models, each potential security model being accessible by multiple external applications and defining how data and services are to be secured;
   retrieving, by the security policy engine computer platform based on the received indication identifying the security policy package to be created, a potential security specification from a security specifications data store, the retrieved potential security specification representing a list of rules and authorizations that are defined based on the retrieved potential security model, wherein the security specifications data store contains a plurality of potential security specifications, each potential security specification being accessible by the multiple external applications; and
   creating, by the security policy engine computer platform, a security policy package for the external application as a service, the created security policy package including the retrieved potential security model and the retrieved potential security specification, the retrieved potential security specification representing a list of rules and authorizations that are defined based on the retrieved security model, wherein the retrieved security specification and the retrieved security model are distinct from each other.

12. The method of claim 11, wherein the security model data store contains at least one of: (i) customer security models, (ii) security model templates, and (iii) a pluggable component.

13. The method of claim 11, wherein at least one of the potential security models includes at least one of: (i) a role definition, and (ii) an entity.

14. The method of claim 11, wherein at least one of the potential security models is associated with at least one of: (i) a Harrison, Ruzzo, Ullman protocol, (ii) a mandatory access control protocol, (iii) a discretionary access control protocol, (iv) a rule-based access control protocol, (v) matrix access control, (vi) a take-grant model, (vii) attribute-based access control, (viii) a Bell-LaPadulla protocol, (ix) a Chinese wall model, and (x) any other access control protocol.

15. The method of claim 11, wherein the security specifications data store contains at least one of: (i) customer security models, (ii) security model templates, and (iii) a pluggable component.

16. The method of claim 11, wherein at least one of the potential security specifications is associated with at least one of: (i) a healthcare application, (ii) a finance application, (iii) a software application, (iv) an education application, and (v) any other enterprise application.

17. A non-transitory, computer-readable medium storing program code, the program code executable by a computer processor to cause the processor to perform a method associated with security policy implementation, the method comprising:

receiving, by a security policy engine computer platform from an external application, an indication identifying a security policy package to be created;

retrieving, by the security policy engine computer platform based on the received indication identifying the security policy package to be created, a potential security model from a security model data store containing a plurality of potential security models, each potential security model being accessible by multiple external applications and defining how data and services are to be secured;

retrieving, by the security policy engine computer platform based on the received indication identifying the security policy package to be created, a potential security specification from a security specifications data store, the retrieved potential security specification representing a list of rules and authorizations that are defined based on the retrieved potential security model, wherein the security specifications data store contains a plurality of potential security specifications, each potential security specification being accessible by the multiple external applications, wherein the retrieved security specification and the retrieved security model are distinct from each other;

creating, by the security policy engine computer platform as a service, a security policy package for the external application, the created security policy package including the retrieved potential security model and the retrieved potential security specification, the retrieved potential security specification representing a list of rules and authorizations that are defined based on the retrieved security model.

18. The medium of claim 17, wherein a web user interface receives security policy design information from a security architect.

19. The medium of claim 17, wherein the received indication of the security policy package is associated with at least one of: (i) an application programming interface, (ii) a software development kit, (iii) a model extension, and (iv) an authorization check.

* * * * *